US012595193B2

(12) United States Patent
    Antony Prince

(10) Patent No.:  US 12,595,193 B2
(45) Date of Patent:       Apr. 7, 2026

---

(54) MEMBRANE WASTEWATER TREATMENT SYSTEM AND METHOD THEREOF

(71) Applicant: MEMSIFT INNOVATIONS PTE. LTD., Singapore (SG)

(72) Inventor: James Selvaraj Antony Prince, Singapore (SG)

(73) Assignee: Memsift Innovations PTE. LTD., Singapore (SG)

( * ) Notice: Subject to any disclaimer, the term of this patent is extended or adjusted under 35 U.S.C. 154(b) by 1015 days.

(21) Appl. No.: 17/772,009

(22) PCT Filed: Feb. 4, 2021

(86) PCT No.: PCT/SG2021/050059
     § 371 (c)(1),
     (2) Date: Apr. 26, 2022

(87) PCT Pub. No.: WO2022/169406
     PCT Pub. Date: Aug. 11, 2022

(65) Prior Publication Data
     US 2023/0234861 A1       Jul. 27, 2023

(51) Int. Cl.
     *C02F 1/44*        (2023.01)
     *B01D 61/36*       (2006.01)
     (Continued)

(52) U.S. Cl.
     CPC ............ *C02F 1/447* (2013.01); *B01D 61/364* (2013.01); *B01D 61/366* (2013.01); *B01D 63/082* (2013.01); *B01D 63/103* (2013.01); *B01D 63/14* (2013.01); *B01D 69/02* (2013.01); *B01D 2313/143* (2013.01); *B01D 2313/146* (2013.01);
     (Continued)

(58) Field of Classification Search
     CPC .... C02F 1/447; C02F 2301/06; B01D 61/364; B01D 61/366; B01D 63/082; B01D 63/103; B01D 63/14; B01D 69/02; B01D 2313/221; B01D 2325/0283;
     (Continued)

(56) References Cited

U.S. PATENT DOCUMENTS 4,620,900 A  *  11/1986  Kimura ................ B01D 61/364
                                                        202/202

FOREIGN PATENT DOCUMENTS

| | | | | |
|---|---|---|---|---|
| CN | 108067100 A | * | 5/2018 | ........... B01D 61/364 |
| JP | 2012115778 A | * | 6/2012 | ............. B01D 61/36 |

(Continued)

OTHER PUBLICATIONS

KR-20150003096-A_English translation (Year: 2015).*

(Continued)

*Primary Examiner* — Youngsul Jeong
(74) *Attorney, Agent, or Firm* — Cesari and McKenna LLP; Steven M. Mills

(57)                    ABSTRACT

This document describes systems and methods for treating and recovering water from feed solutions using a multilayer module with an expansion chamber. The multilayer module comprises a feed spacer layer, a permeate spacer layer and a membrane layer, wherein water vapor evaporated from the feed solution in the feed spacer passes through the membrane layer into the permeate spacer layer. The expansion chamber receives the water vapor from the permeate spacer layer and the feed solution from the feed spacer layer.

15 Claims, 8 Drawing Sheets

(51) Int. Cl.
| | | |
|---|---|---|
| *B01D 63/08* | (2006.01) | |
| *B01D 63/10* | (2006.01) | |
| *B01D 63/14* | (2006.01) | |
| *B01D 69/02* | (2006.01) | |

(52) U.S. Cl.
CPC .. *B01D 2313/221* (2022.08); *B01D 2313/243* (2013.01); *B01D 2317/025* (2013.01); *B01D 2325/0283* (2022.08); *B01D 2325/04* (2013.01); *C02F 2301/06* (2013.01)

(58) Field of Classification Search
CPC ........ B01D 2313/143; B01D 2313/146; B01D 2313/243; B01D 2317/025; B01D 2325/04
See application file for complete search history.

(56) References Cited

FOREIGN PATENT DOCUMENTS

| | | | | |
|---|---|---|---|---|
| KR | 20150003096 A * | 1/2015 | ........... | B01D 61/364 |
| KR | 1020150003096 B1 | 1/2015 | | |
| WO | WO-2019083459 A1 * | 5/2019 | ............. | C02F 1/444 |
| WO | WO-2020190212 A1 * | 9/2020 | ........... | B01D 63/082 |

OTHER PUBLICATIONS

JP-2012115778-A_English translation (Year: 2012).*
CN-108067100-A_English translation (Year: 2018).*
International Preliminary Report on Patentability for co-pending PCT/SG2021/050059 filed Apr. 2, 2021; Report issued Aug. 24, 2021; 17 pages.

* cited by examiner

MEMBRANE WASTEWATER TREATMENT SYSTEM AND METHOD THEREOF

CROSS-REFERENCE TO RELATED APPLICATIONS

This application is a U.S. national stage application under 35 U.S.C. 371 of co-pending International Application No. PCT/SG2021/050059, filed on Feb. 4, 2021, and entitled membrane wastewater treatment system and method thereof.

FIELD OF THE INVENTION

The present invention generally concerns systems and methods for treating a feed solution. More specifically, the invention discloses membrane-based distillation systems and methods for recovering water and resources from wastewater with enhanced efficiency and zero liquid discharge.

BACKGROUND OF THE INVENTION

In many countries, the discharge of industrial wastewater (e.g. from mining, oil and gas, semiconductor fabrication, electroplating, pharmaceutical, dye/textile and nuclear power production etc.,) with high Total Dissolved Solids (TDS) or/Chemical Oxygen Demand (COD) into the sewer or natural water bodies is prohibited to prevent overloading of the water treatment plant or destruction to marine lives.

Reverse osmosis (RO) is one of the major technologies that have been used to treat low strength industrial wastewater, seawater, surface wastewater for reuse or drinking. However, a drawback of RO, for instance in seawater desalination, is its low recovery of water (approximately 45%) from seawater due to limitations in highly pressurized systems that are required for recovering water from solutions having high osmotic strengths. Furthermore, RO poses a challenge in the disposal of the brine or high strength industrial wastewater that remains after water has been recovered.

Therefore, brine/high strength industrial wastewater treatment systems with zero liquid discharge (ZLD) are potentially advantageous. Currently, conventional thermal separation processes such as multi-stage evaporator and crystallizer technology have been used post-RO to increase water recovery and to separate other contaminants/salts from the wastewater. However, these thermal separation processes are highly energy demanding.

More recently, membrane distillation has been considered as a low cost, energy-saving alternative to the above thermal separation processes. In a membrane distillation system, a membrane that is permeable to vapor but impermeable to liquid water separates a heated feed stream from a cooler product water stream. Water vapor that is evaporated from the heated feed stream passes through the membrane due to a gradient in vapor pressure and condenses in the product water stream. The advantages of the membrane distillation system are relatively low operating pressures and temperatures as compared with conventional thermal based separation process, hence decreasing energy demands.

Therefore, membrane distillation is a good alternative for treating wastewater. However, the membranes used in membrane distillation are very sensitive to acids and organic solvents that alter the wettability of the membranes. If the membrane in a conventional membrane distillation process is wetted, the wetted membrane will allow contaminants to pass through, leading to contamination of the product water stream.

It is an objective of this invention to provide membrane-based systems and methods thereof for treating wastewater with enhanced energy efficiencies over the current thermal separation and membrane distillation processes. The present invention also ideally provides ZLD and can complement other wastewater treatment processes such as but not limited to RO to improve water recovery. The present invention is also able to separate liquids with different boiling points (e.g.; alcohol:water/acetone:water/oil:water/glycol:water/ etc.) and reduce contamination from membrane wetting.

SUMMARY OF THE INVENTION

The above and other problems in the art are solved and an advance in the art is made in accordance with this invention.

A first advantage of a membrane wastewater treatment system in accordance with this invention is that up to 100% of water may be recovered from wastewater or contaminated feed solutions.

A second advantage of a membrane wastewater treatment system in accordance with this invention is that the system is more energy efficient than existing membrane distillation systems.

A third advantage of a membrane wastewater treatment system in accordance with this invention is that this system is able to recover water at a faster rate while consuming less energy as compared to existing membrane distillation systems.

A fourth advantage of a membrane wastewater treatment system in accordance with this invention is that this system is easily scalable.

A fifth advantage of a membrane wastewater treatment system in accordance with this invention is that this system is able to separate liquids with different boiling points.

A sixth advantage of a membrane wastewater treatment system in accordance with this invention is that this system is robust and able to withstand harsh or acidic feed solutions.

A seventh advantage of a membrane wastewater treatment system in accordance with this invention is that this system provides for membrane with high surface area to volume ratio for efficient mass transfer, hence allowing for high efficiency water recovery.

An eighth advantage of a membrane wastewater treatment system in accordance with this invention is that this system is relatively inexpensive.

A ninth advantage of a membrane wastewater treatment system in accordance with this invention is that this system has low operating/maintenance costs.

A tenth advantage of a membrane wastewater treatment system in accordance with this invention is that this system is able to mitigate impairment of performance arising from membrane wetting.

An eleventh advantage of a membrane wastewater treatment system in accordance with this invention is that the invention allows for facile replacement of the membrane.

In accordance with a first aspect of the invention, the invention provides a multilayer module for treating a feed solution. The multilayer module comprises a first feed spacer layer having a first end provided adjacent an inlet of the multilayer module and a second end provided adjacent an outlet of the multilayer module to allow the feed solution to pass from the inlet to the outlet of the multilayer module; a first membrane layer having a first surface that is in contact with a surface of the first feed spacer layer; and a permeate spacer layer having a first surface that is in contact with a second surface of the first membrane layer such that water vapor evaporated from the feed solution in the first feed spacer layer passes through the first membrane layer into the permeate spacer layer, wherein the outlet of the multilayer module is configured to couple to an expansion chamber such that the expansion chamber receives the water vapor from the permeate spacer layer and the feed solution from the feed spacer layer, whereby a pressure difference is provided between the expansion chamber and the feed spacer layer to cause the feed solution from the feed spacer layer to expand and vaporize into water vapor when the feed solution exits the outlet of the multilayer module.

In accordance with embodiments of the first aspect of the invention, the multilayer module comprises multiple membrane layers, permeate spacer layers and feed spacer layers in an arranged order. For instance, the multilayer module may further comprise a second membrane layer having a first surface that is in contact with a second surface of the permeate spacer layer; and a second feed spacer layer having a first end provided adjacent to the inlet of the multilayer module and a second end provided adjacent to the outlet of the multilayer module to allow the feed solution to pass from the inlet to the outlet of the multilayer module, the second feed spacer layer having a first surface that is in contact with the second surface of the second membrane layer such that water vapor evaporated from the feed solution in the second feed spacer layer passes through the second membrane layer into the permeate spacer layer.

In accordance with embodiments of the first aspect of the invention, the expansion chamber that is coupled to the multilayer module is maintained at a negative pressure.

In accordance with embodiments of the first aspect of the invention, the multilayer module and the expansion chamber are configured to enable fluid flow from the multilayer module to the expansion chamber via gravity.

In accordance with embodiments of the first aspect of the invention, the feed spacer layers, membrane layers and permeate spacer layer are arranged concentrically within the multilayer module.

In accordance with embodiments of the first aspect of the invention, the feed spacer layers, membrane layers and permeate spacer layer are planar sheets that are stacked within the multilayer module.

In accordance with embodiments of the first aspect of the invention, the feed spacer layers, membrane layers and permeate spacer layer form a composite layer that is folded one or more times within the multilayer module.

In accordance with embodiments of the first aspect of the invention, the feed spacer layers, membrane layers and permeate spacer layer are arranged spirally within the multilayer module.

In accordance with embodiments of the first aspect of the invention, the multilayer module is configured such that an end of the permeate spacer layer proximal to the inlet of the multilayer module is not in direct contact with the feed solution at the inlet of the multilayer module.

In accordance with embodiments of the first aspect of the invention, the membrane layers of the multilayer module comprise a microporous structure, having an average pore size between 1 nm and 100 μm.

In accordance with embodiments of the first aspect of the invention, the feed spacer layers or permeate spacer layer of the multilayer module is made of a thermoplastic material selected from PTFE, PVDF, PP, PET, HDPE, LDPE, ABS, CPVC, PVC and UPVC.

In accordance with embodiments of the first aspect of the invention, the feed spacer layers or the permeate spacer layer of the multilayer module has a thickness of 0.001 mm to 100 mm.

In accordance with embodiments of the first aspect of the invention, a spacer angle of the feed spacer layers or permeate spacer layer is 45° to 120°.

In accordance with embodiments of the first aspect of the invention, the multilayer module further comprises a liquid-vapor separator provided at the inlet of the multilayer module, wherein the liquid-vapor separator is configured to couple the inlet of the multilayer module to an outlet of another multilayer module such that feed solution from the outlet of the another multilayer module is separated from water vapor from the outlet of the another multilayer module, and provided as feed solution to the first feed spacer layer of the multilayer module. This enables the multilayer module to be coupled to one or more other multilayer modules to increase water recovery.

In accordance with a second aspect of the invention, a method for treating a feed solution using a multilayer module having a first feed spacer layer having a first end provided adjacent an inlet of the multilayer module and a second end provided adjacent an outlet of the multilayer module to allow the feed solution to pass from the inlet to the outlet of the multilayer module, a first membrane layer having a first surface that is in contact with a surface of the first feed spacer layer, and a permeate spacer layer having a first surface that is in contact with a second surface of the first membrane layer such that water vapor evaporated from the feed solution in the first feed spacer layer passes through the first membrane layer into the permeate spacer layer is provided. The method comprises receiving, at the inlet of the multilayer module, the feed solution; passing the feed solution through the feed spacer layer; diffusing water vapor from the feed solution in the feed spacer layer to the permeate spacer layer through the membrane layer; expanding and vaporizing, at an expansion chamber provided at the outlet of the multilayer module, feed solution from the outlet of the multilayer module as the feed solution exits the feed spacer layer at the outlet of the multilayer module, via a pressure difference existing between the expansion chamber and the feed spacer layer.

In accordance with embodiments of the second aspect of the invention, the multilayer module used in the method for treating a feed solution comprises multiple membrane layers, permeate spacer layers and feed spacer layers in an arranged order. For instance, the multilayer module further comprises a second membrane layer having a first surface that is in contact with a second surface of the permeate spacer layer; and a second feed spacer layer having a first end provided adjacent to the inlet of the multilayer module and a second end provided adjacent to the outlet of the multilayer module to allow the feed solution to pass from the inlet to the outlet of the multilayer module, the second feed spacer layer having a first surface that is in contact with the second surface of the second membrane layer such that water vapor evaporated from the feed solution in the second feed spacer layer passes through the second membrane layer into the permeate spacer layer.

In accordance with embodiments of the second aspect of the invention, the method further comprises heating the feed solution before the step of receiving, at the inlet of the multilayer module, the feed solution.

In accordance with embodiments of the second aspect of the invention, the method further comprises pressurising the feed solution before the step of receiving, at the inlet of the multilayer module, the feed solution.

In accordance with embodiments of the second aspect of the invention, the method further comprises utilising heat from condensing the water vapor from the expansion chamber to heat the feed solution.

BRIEF DESCRIPTION OF THE DRAWINGS

The drawings illustrate, by way of example, exemplary embodiments of the present invention and should not be taken to be limiting the scope of the present invention.

DETAILED DESCRIPTION

Embodiments of the present invention are described herein. The person of ordinary skill in the art will realize that the following description of the present invention is for illustrative purposes only and should not be seen in any way as limiting the scope of the invention. Other embodiments of the invention may be devised by such skilled persons without deviating from the present invention.

The present invention provides systems and methods for treating a feed solution, in particular, for recovery of water from the feed solution. The feed solution may be but not limited to industrial wastewater, seawater, or wastewater from an upstream water treatment process such as reverse osmosis or the like. The term, feed solution or wastewater may be used interchangeably from here onwards. One skilled in the art will recognize that most types of liquids may be used as the feed solution or wastewater without departing from this invention.

Other applications of the present invention include separation of liquids with different boiling points (e.g. alcohol:water/acetone:water/oil:water/glycol:water/etc.), where it separates the low boiling liquid from the high boiling point liquid by leveraging the vapour pressure difference or as part of a cooling system whereby the present invention may be configured to remove heat by enhancing mass transfer/evaporation of a liquid coolant.

Figure 1:
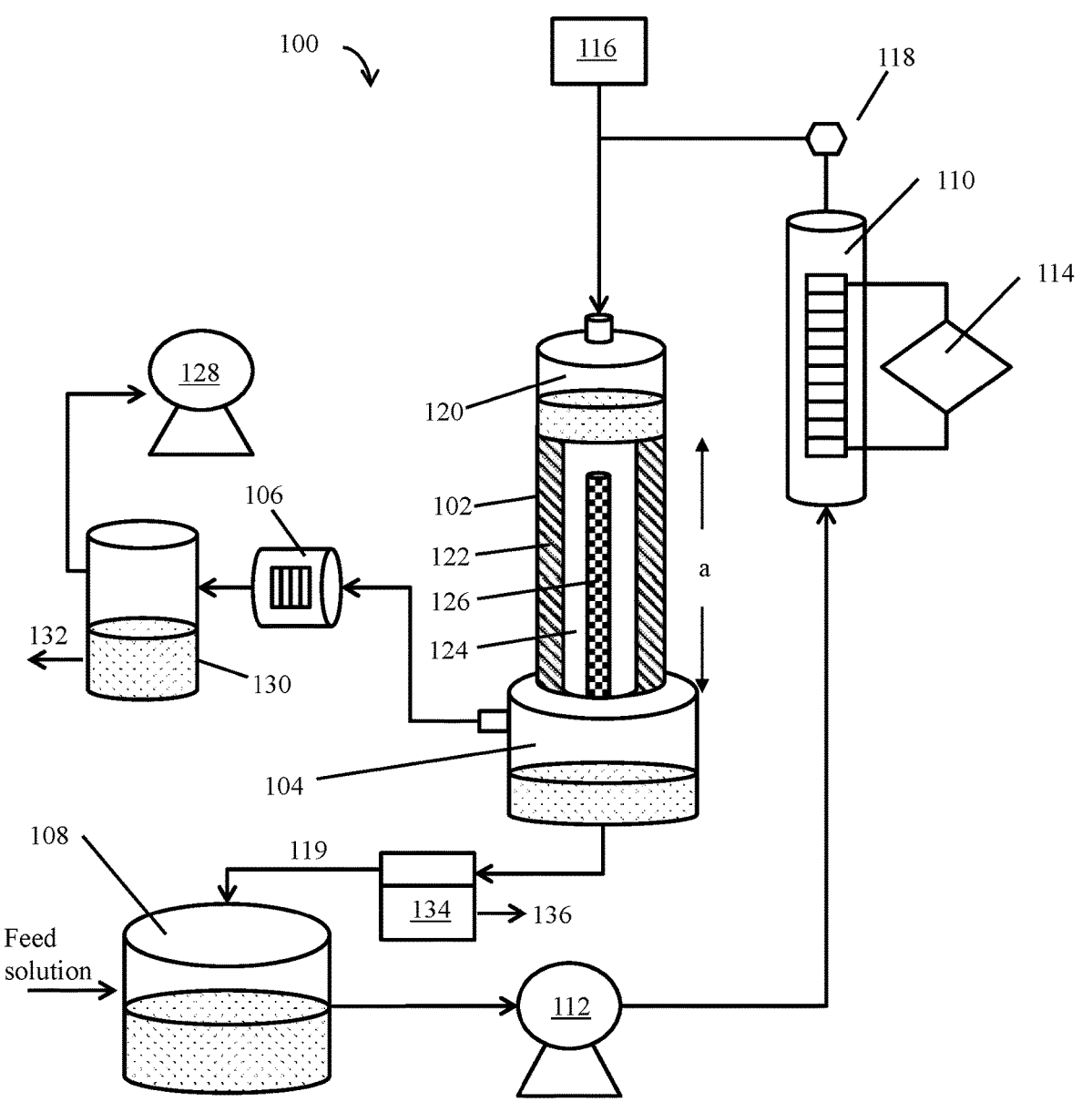
FIG. 1 is a schematic drawing of an embodiment of a wastewater treatment system in accordance with embodiments of the invention.

In an aspect of the invention, the invention is exemplified as a wastewater treatment system (100) as shown in FIG. 1. The wastewater treatment system (100) comprises, inter alia, a multilayer module (102), an expansion chamber (104) and a condenser (106).

The multilayer module (102) comprises an inlet for receiving a heated, pressurized feed solution that is to be treated by the wastewater treatment system (100), and an outlet that is in fluid connection to the expansion chamber (104).

The feed solution that is to be treated by the wastewater treatment system (100) may be received and stored in a feed tank (108) before feeding to the multilayer module (102). The feed solution from the feed tank (108) may be heated by passing the feed solution through one or more heating elements (110). This may be carried out by way of a pump (112) which may be a magnetic pump or a centrifugal pump. The one or more heating elements (110) may be a heater that generates heat from a power source (114) or a heat exchanger that is configured to transfer heat to the feed solution from an external steam or hot water.

The feed solution may be pressurized by a pressurizing unit (116) that is configured to pressurize the feed solution prior to feeding the feed solution to the multilayer module (102). The person skilled in the art would realize that the sequence of heating and pressurizing may be interchangeable or may occur simultaneously and the pressurization of the feed solution leads to a corresponding increase in temperature, hence less energy may be expended in heating the feed solution.

The pressurizing unit (116) may be a compressed gas supply that delivers compressed gas to the feed solution. Besides serving to pressurize the feed solution, the compressed gas may also serve as an air bubble generator that enhances evaporation of the feed solution.

In some embodiments, the wastewater treatment system (100) may further comprise a non-return valve (118) to ensure unidirectional flow of the feed solution into the multilayer module (102).

In some embodiments, the wastewater treatment system (100) may further comprise a pressurization chamber (120) adjacent to the inlet of the multilayer module (102) and configured to receive heated feed solution from the one or more heating elements (110). The pressurization chamber (120) may be a part of the multilayer module (102), as shown in FIG. 1, or a separate unit. The pressurization chamber (120) is in fluid communication with the pressurizing unit (116) to compress the heated feed solution within the pressurization chamber (120) and feed the heated and pressurized feed solution to the inlet of the multilayer module (102). In some embodiments, the pressurization chamber (120) may further be in fluid communication with the one or more heating elements (110) such that any water vapor that is evaporated from the feed solution within the pressurization chamber (120) may be channeled to the one or more heating elements (110) for heating the feed solution.

The multilayer module (102) comprises multilayers including a feed spacer layer (122), a membrane layer (124), and a permeate spacer layer (126). The feed spacer layer (122) comprises a first end provided at the inlet of the multilayer module (102) and a second end provided at the outlet of the multilayer module (102) to allow the feed solution to flow from the inlet of the multilayer module (102) to the outlet of the multilayer module (102). In embodiments where the multilayer module (102) comprises a pressurization chamber (120), the feed spacer layer (122) is configured to allow the heated and pressurized feed solution to flow from the pressurization chamber (120) to the outlet of the multilayer module (102).

The feed spacer layer (122) may be made from a thermoplastic material that is capable of withstand an operating temperature of more than 25° C. For instance, the thermoplastic material of the feed spacer layer (122) may be but not limited to PTFE, PVDF, PP, PET, HDPE, LDPE, ABS, CPVC, PVC, UPVC, etc.

In some embodiments, the feed spacer layer (122) may be made from a metal or ceramic material. Such feed spacer layer (122) would be suitable for high temperature applications.

Generally, the feed spacer layer (122) has a thickness from 0.01 mm to 100 mm, more preferably in the range of 0.1 mm to 10 mm, and a width (indicated as "a" in FIG. 1), dependent on module requirements, ranged from 0.01 m to 100 m. A spacer angle of the feed spacer layer (122) may be 1° to 180°, preferably 45° to 120°. One skilled in the art will recognize that the spacer angle refers to the angle between filaments within a particular membrane, e.g. the angle between the filaments that make up the feed spacer layer.

The membrane layer (124) is provided between the feed spacer layer (122) and the permeate spacer layer (126), with a first surface of the membrane layer (124) in contact with a surface of the feed spacer layer (122) and a second surface of the membrane layer (124) in contact with a surface of the permeate spacer layer (126). The membrane layer (124) is substantially permeable to water vapor but not liquid water, hence, the water vapor resulting from evaporation of the feed water in the feed spacer layer (122) is able to pass through or diffuse through the membrane layer (124), due to differences in vapor pressure, to the permeate spacer layer (126). Hence, the membrane layer (124) serves as a barrier separating the feed solution in the feed spacer layer (122) and water vapor in the permeate spacer layer (126).

The membrane layer (124) may comprise a microporous structure with an average pore size between 1 nm and 100 μm. Preferably, the average pore size is between 50 nm to 500 nm.

The membrane layer (124) may be made from a thermoplastic, ceramic, or metal material comprising a hydrophobic and/or oleophobic surface.

In an embodiment, the permeate spacer layer (126) is configured such that an end of the permeate spacer layer proximal to the inlet of the multilayer module (102) is not in direct contact with the heated and pressurized feed solution at the inlet of the multilayer module (102) or from the pressurization chamber (120). As an example, as seen from FIG. 1, the end of the permeate spacer layer proximal to the inlet of the multilayer module (102) may be separated from the heated and pressurized feed solution at the inlet of the multilayer module (102) or from the pressurization chamber (120) by the membrane layer (124).

Water vapor resulting from evaporation of the feed water in the feed spacer layer (122) passes across the membrane layer (124) and collects in the permeate spacer layer (126) that passes the water vapor to the outlet of the multilayer module (102).

The permeate spacer layer (126) may be made from a thermoplastic material that is capable of withstand an operating temperature of more than 25 deg C. For instance, the thermoplastic material of the permeate spacer layer (126) may be but not limited to PTFE, PVDF, PP, PET, HDPE, LDPE, ABS, CPVC, PVC, UPVC, etc.

In some embodiments, the permeate spacer layer (126) may be made from a metal or ceramic material. Such metal or ceramic based feed spacer layer (126) would be suitable for high temperature applications.

Generally, the permeate spacer layer (126) has a thickness from 0.001 mm to 100 mm, more preferably in the range of 0.01 mm to 10 mm, and a width, dependent on module requirements, ranged from 0.01 m to 100 m. A spacer angle of the permeate spacer layer (126) may be 1° to 180°, preferably 45° to 120°.

In some embodiments, the multilayer module (102) may be configured in a multi-layered flat sheet arrangement, wherein the feed spacer layer (122), the membrane layer (124) and the permeate spacer layer (126) are flat sheets that are stacked together and wherein the feed solution and water vapor are passed from the inlet towards the outlet of the multilayer module (102) in a planar direction of the flat sheets.

Figure 3A:
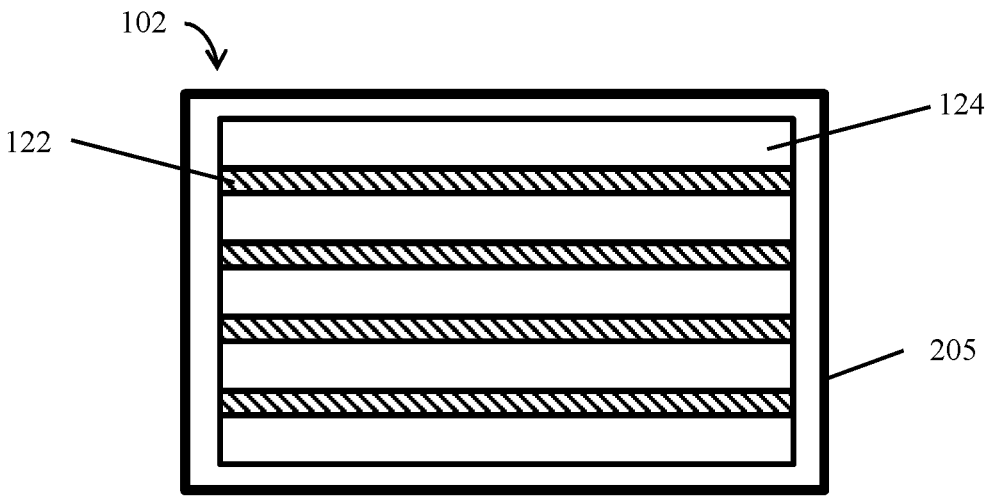
FIGS. 3a-3b are schematic drawings of a multilayer module in accordance with an embodiment of the invention.
Figure 3B:
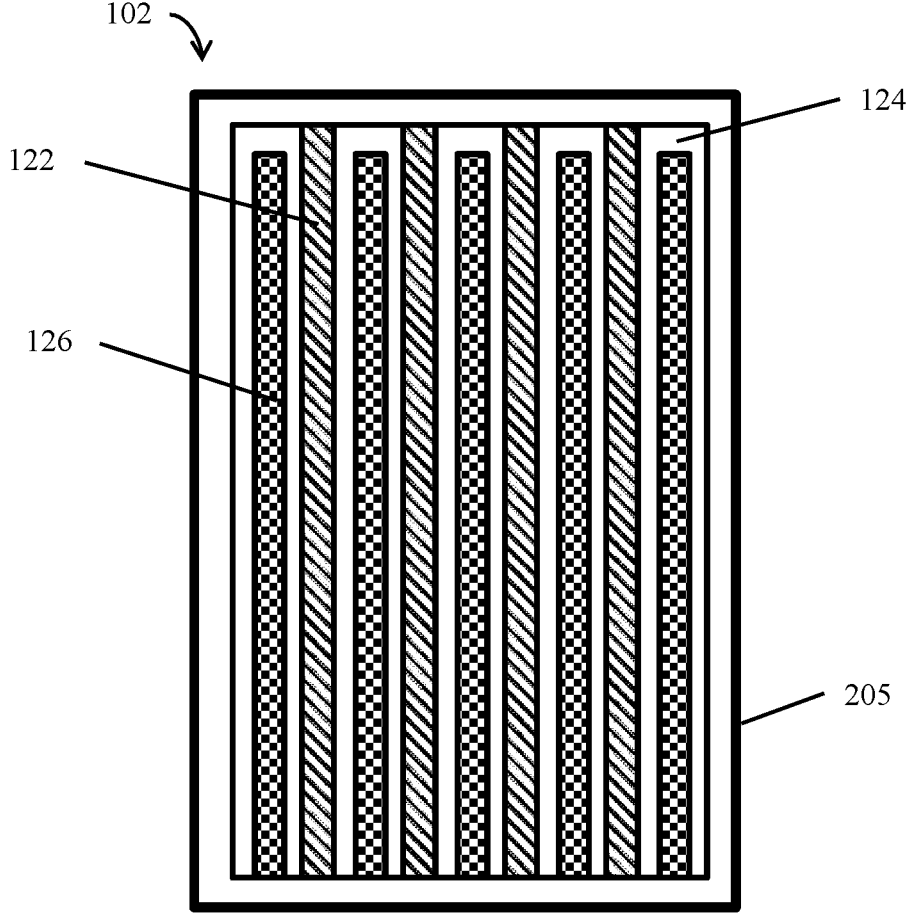

FIGS. 3a and 3b show a top and side view of a preferred embodiment of the multilayer module (102) in the multi-layered flat sheet arrangement. The multilayer module comprises alternating feed spacer layer (122) and permeate spacer layer (126) that are separated by the membrane layer (124). As seen from FIGS. 3a and 3b, an end of the permeate spacer layer (126) at the top of the multilayer module (102) that is proximal to the inlet of the multilayer module or the pressurization chamber (120) may be enclosed by the adjacent membrane layer (124).

In some embodiments, the multilayer module (102) may be configured in a concentric arrangement, wherein the feed spacer layer (122), the membrane layer (124) and the permeate spacer layer (126) that are arranged concentrically. For instance, FIG. 1 shows an embodiment of the multilayer module (102) comprising a central core of the permeate spacer layer (126) with the membrane layer (124) and feed spacer layer (122) arranged concentrically around the central core. While FIG. 1 shows the multilayer module (102) to comprise a central core of the permeate spacer layer (126), this should not be seen as limiting to the scope of the invention. The multilayer module (102) may, for instance, comprise a central core of the feed spacer layer (122) with peripheral layers of the membrane layer (124) and permeate spacer layer (126) arranged concentrically around the central core.

In a preferred embodiment, the multilayer module (102) comprises a plurality of the feed spacer layer (122), the membrane layer (124) and the permeate spacer layer (126).

Figures 2A, 2B, 2C:
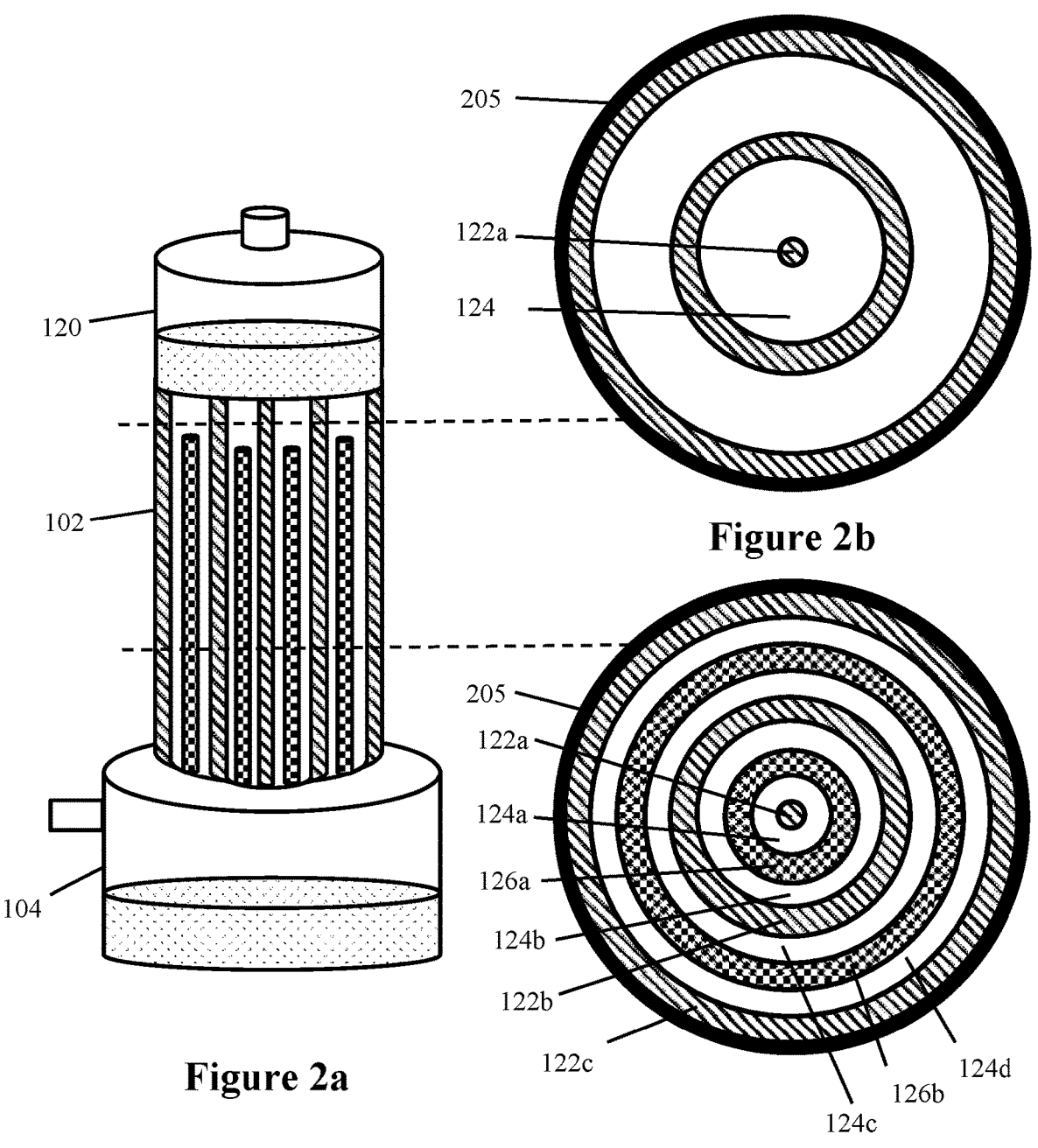
FIGS. 2a-2c are schematic drawings of an exemplary embodiment of a multilayer module in accordance with embodiments of the invention in different views.

FIGS. 2a-2c shows an exemplifying embodiment of the multilayer module (102) comprising a plurality of the feed spacer layer (122), the membrane layer (124) and the permeate spacer layer (126) that are arranged concentrically around a central core of a first feed spacer layer (122a). As shown in FIG. 2c, a first surface of a first membrane layer (124a) is in contact with a surface of the first feed spacer layer (122a) and a second surface of the first membrane layer (124a) is in contact with a first surface of a first permeate spacer layer (126a). A second surface of the first permeate spacer layer (126a) is in contact with a first surface of a second membrane layer (124b) while a second surface of the second membrane layer (124b) is in contact with a first surface of a second feed spacer layer (122b).

The multilayer module (102) comprises additional layers of the feed spacer layer (122), membrane layer (124) and permeate spacer layer (126) that are arranged in the order as described in the preceding paragraph and shown in FIG. 2c. For simplicity, FIGS. 2a-2c has not been drawn to scale and FIG. 2c shows only additional membrane layers (124c and 124d), permeate spacer layer (126b) and feed spacer layer (122c). However, as would be understood by the skilled person, the multilayer module (102) may comprise any number of the feed spacer layer (122), membrane layer (124)

and permeate spacer layer (126). Further, while the embodiment of FIG. 2 is shown as having a core comprising feed spacer layer (122*a*), it is not to be seen as limiting to the scope of the invention.

FIG. 2*b* shows a transverse section of an embodiment of the multilayer module (102) proximal to the inlet of the multilayer module (102) or pressurization chamber (120). FIG. 2*b* is devoid of the permeate spacer layer (126) as the permeate spacer layer (126) is not in direct contact with the hot and pressurized feed solution at the inlet of the multilayer module (102) or the pressurization chamber (120). The end of the permeate spacer layer (126) that is proximal to the inlet of the multilayer module (102) or the pressurization chamber (120) may be enclosed by the membrane layers that are adjacent to the permeate spacer layer.

In a preferred embodiment, the multilayer module (102) comprises an external shell (205) that encases the multilayers. The external shell (205) is configured to enable removal and replacement of the multilayers. This facilitates maintenance and reduces operating costs as the multilayers may be replaced without having to replace the entire multilayer module (102). The multilayers may be pre-assembled as a membrane module for installing into the multilayer module (102).

The skilled person would be able to derive the multilayer module (102) that is configured with alternative arrangements based on the disclosure of the present invention and such alternative arrangements are considered to be within the scope of the present invention.

Figure 4:
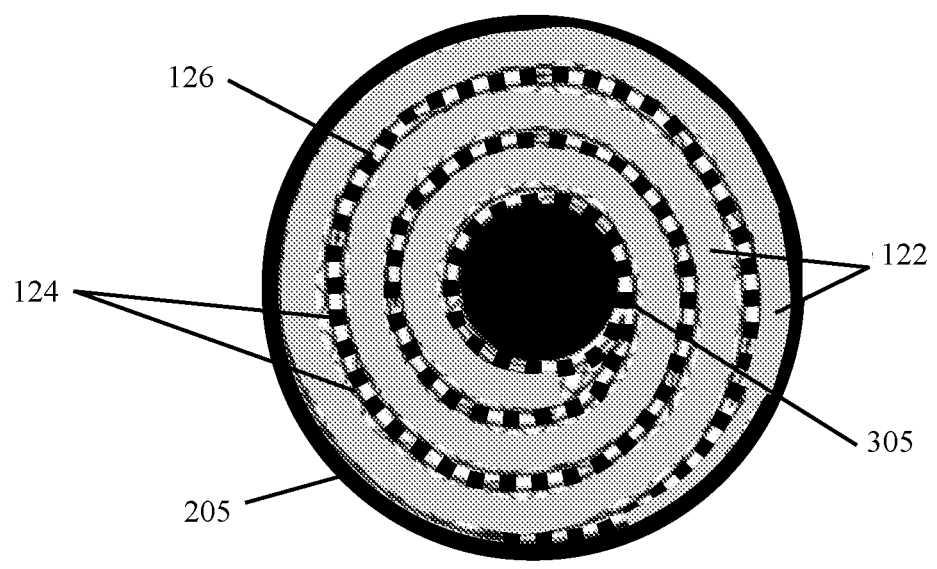
FIG. 4 is a schematic drawing of a multilayer module in accordance with an embodiment of the invention.

For instance, FIG. 4 shows an embodiment of the multilayer module (102) that is configured based on a spiral arrangement of the feed spacer layer (122), membrane layer (124) and permeate spacer layer (126) within the external shell (205) of the multilayer module (102). The multilayer module (102) may further comprise a central support core (305).

Figure 5:
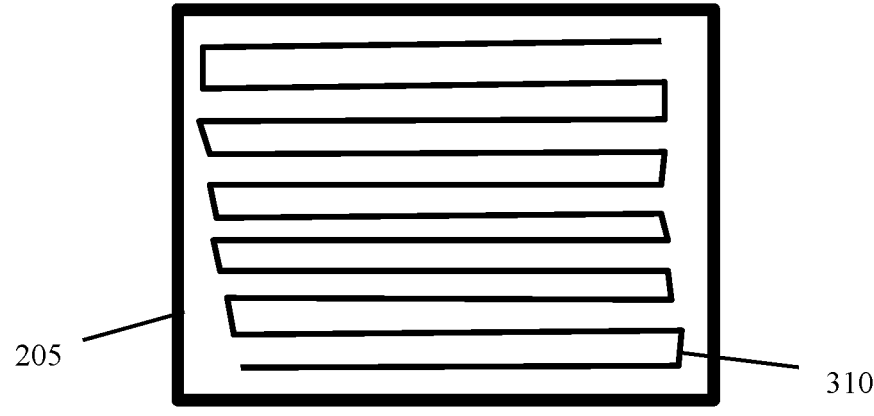
FIG. 5 is a schematic drawing of a multilayer module in accordance with an embodiment of the invention.

FIG. 5 shows a top view of another embodiment of the multilayer module (102) that is configured based on a multi-fold arrangement of the feed spacer layer (122), membrane layer (124) and permeate spacer layer (126) within the external shell (205) of the multilayer module (102). In the multi-fold arrangement, a composite layer (310) comprising one or more of the feed spacer layer (122), membrane layer (124) and permeate spacer layer (126) is folded one or more times upon itself.

It should be understood that the multilayer module (102) may assume arbitrary shapes besides cylindrical, cube or cuboid that are exemplified herein.

The multilayer module (102) of this invention provides an inexpensive and robust structure for separating water vapor from a feed solution, with high surface area to volume ratio for efficient transfer and ability to withstand acidic or harsh feed solution while maintaining integrity and function of the structure.

The expansion chamber (104) is provided at the outlet of the multilayer module (102) and configured to receive unevaporated feed solution from the feed spacer layer (122) and the water vapor from the permeate spacer layer (126) at the outlet of the multilayer module (102). A pressure difference exists between the expansion chamber (104) and the feed spacer layer (122), and drives the unevaporated feed solution to expand and vaporize as the feed solution enters the expansion chamber (104), hence enhancing vaporization of the feed solution.

In a preferred embodiment, the multilayer module (102) and expansion chamber (104) are configured to enable fluid flow from the multilayer module (102) into the expansion chamber (104) via gravity. This enables the unevaporated feed solution and any condensate in the multilayer module (102) to flow or drain easily into the expansion chamber (104).

The expansion chamber (104) may be in fluid communication with a vacuum generator (128) responsible for supplying a negative pressure/vacuum to the expansion chamber (104) to ensure the pressure difference between the expansion chamber (104) and the feed spacer layer (122). One skilled in the art will recognize that other means may be used to maintain a pressure difference between the expansion chamber (104) and the feed spacer layer (122) without departing from this invention.

In a preferred embodiment, the pressure within the expansion chamber (104) is maintained at a negative pressure of around –0.5 bar and one skilled in the art will recognize that other values of negative pressure may be applied without departing from this invention as long as there exists a higher pressure within the feed spacer layer (122) as compared to the expansion chamber (104).

The condenser (106) is in fluid communication with the expansion chamber (104) and configured to receive and condense water vapor from the expansion chamber (104). The condensate that is free from contaminants may be stored in the condenser (106) or channeled away for use or storage in a condensate tank (130). When the condensate is to be utilized, the condensate may then be obtained from system outlet (132) as required.

In an embodiment, the expanded and unevaporated feed solution, i.e. remnant feed solution collects at a bottom of the expansion chamber (104) and is directed to a solid separator device (134). The solid separator device (134) removes or filters out any solids that may have formed in the remnant feed solution and the removed solids are then extracted out through solid waste outlet (136). The filtered remnant feed solution may be directed back into the feed tank (108) for running through wastewater treatment system (100) again to increase water recovery or in another embodiment of the invention, the filtered remnant feed solution may be directed to the inlet of multilayer module (102). Hence, as no liquids are prematurely discharged, the wastewater treatment system (100) may be considered as a zero liquid discharge system. It is useful to note that the remnant feed solution is much cooler as compared to the feed solution that entered the inlet of multilayer module (102). This is because most of the heat has been removed from the feed solution via evaporation as the feed solution passed through the multilayer module (102) and into the expansion chamber (104).

It is also useful to note at this stage that the wastewater treatment system (100) of the present invention offers several advantages over the conventional water treatment systems such as a lower operating temperature due to application of negative pressure and moderate operating pressure, enhanced mass transfer from liquid to gaseous state, leading to higher recovery, higher gain output ratio and hence improved energy efficiency.

Figure 6:
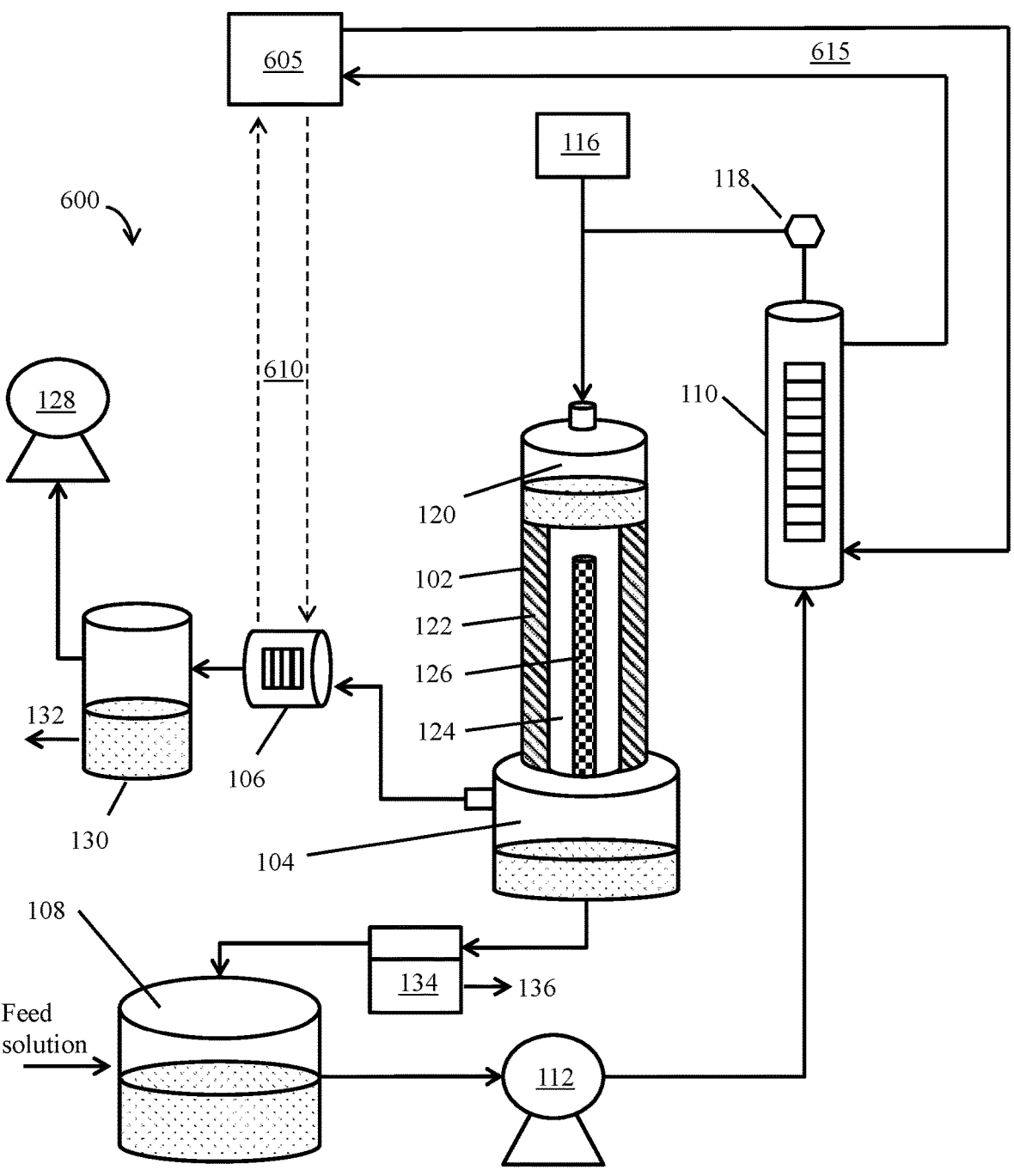
FIG. 6 is a schematic drawing of an embodiment of a wastewater treatment system in accordance with embodiments of the invention whereby this embodiment utilizes a heat pump.

Another embodiment of the wastewater treatment system (600) is illustrated in FIG. 6. In addition to the elements disclosed in FIG. 1, the water treatment system (600) further comprises a heat pump (605). One skilled in the art will recognize that the heat pump (605) is a standard device that may be used to transfer heat from a fluid in a circulating loop to a fluid in another circulating loop. The exact workings of the heat pump (605) has been omitted for brevity. The heat pump (605) may be used to transfer heat arising from condensation process occurring in condenser (106) via loop 610 to one or more heating elements (110) via loop 615.

In some embodiments, the wastewater treatment system may comprise heat pipes that are used to directly transfer the heat arising from condensation process at the condenser (106) to the one or more heating elements (110) or may be used to directly heat the feed solution before the feed solution is directed into the multilayer module (102). In other embodiments, part of the water vapor from the condenser (106) or the expansion chamber (104) may be channeled to the one or more heating elements (110) or to directly heat the feed solution in conduits within the water treatment system as the feed solution is channeled from the feed tank (108) to the multilayer module (102).

Figure 7:
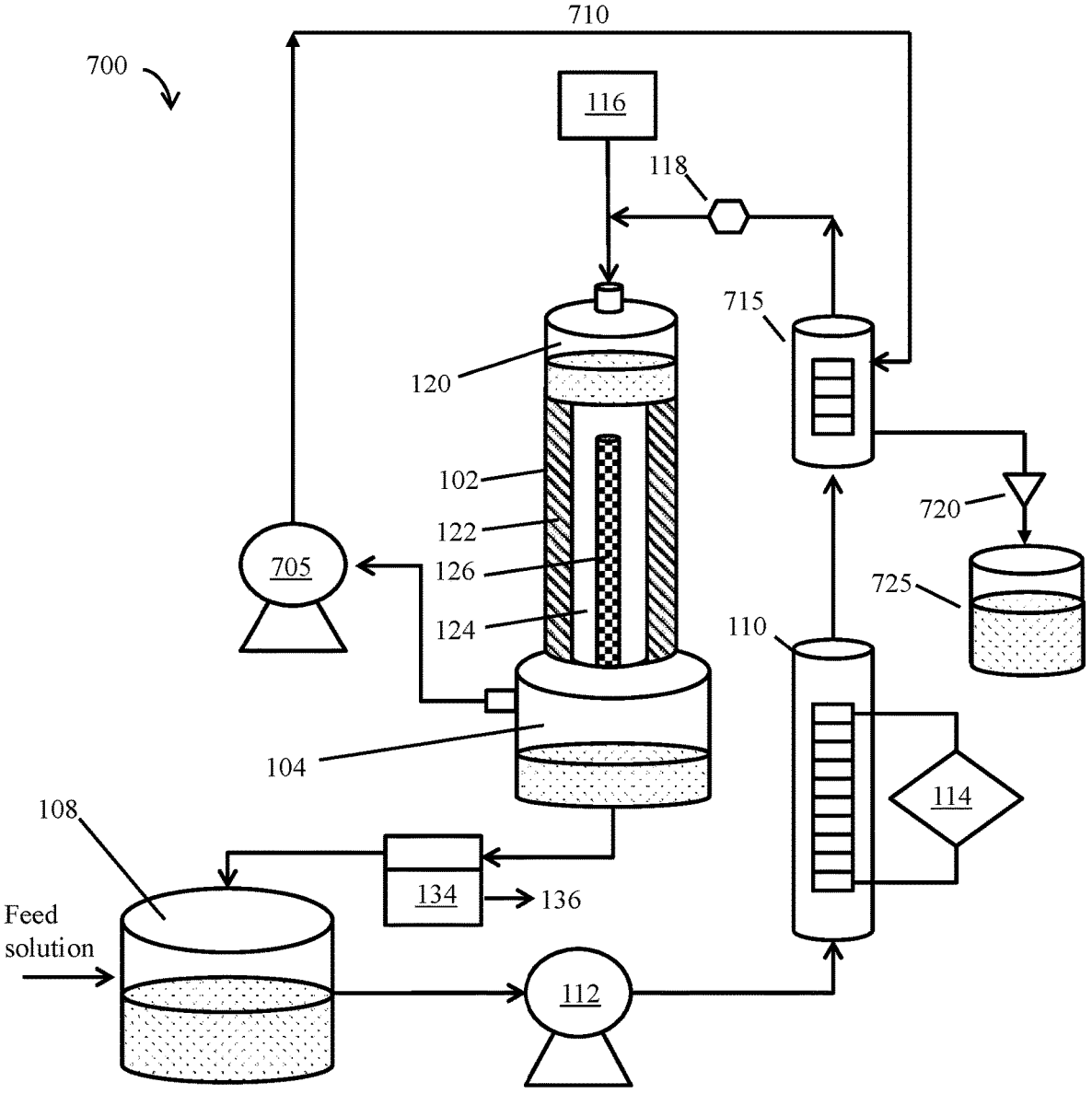
FIG. 7 is a schematic drawing of an embodiment of a wastewater treatment system in accordance with embodiments of the invention whereby this embodiment utilizes an initial preheater for heating the feed solution and a compressor that is in fluid communication with a heat exchanger.

Yet another embodiment of the wastewater treatment system (700) is illustrated in FIG. 7. In this embodiment, a compressor (705) and an additional heat exchanger (715) are utilized. When feed solution is initially pumped from feed tank (108), one or more heating element (110) will be used to initially heat the feed solution. The heated feed solution is then pressurized and directed into multilayer module (102) as previously described. As illustrated in FIG. 7, the compressor (705) is used to maintain expansion chamber (104) at a negative pressure or partial to maximum vacuum by extracting water vapor from the expansion chamber (104). The extracted water vapor is then pressurized by the compressor (705) before being directed to the heat exchanger (715) via path (710). Heat and pressure from the pressurized water vapor is then used by the heat exchanger (715) to heat feed solution from feed tank (108). In this embodiment, the heat exchanger (715) also acts as a condenser. As the heat exchanger (715) removes heat from the water vapor, the water vapor condenses and the condensate is then collected in container (725). A valve (720) provided between the heat exchanger (715) and the container (725) may be used to control flow of the condensate from the heat exchanger (715). This in turn controls a temperature of the heat exchanger (715) whereby more condensate is released into the container (725) when the temperature in the heat exchanger (715) drops.

After the system 700 has been running for a certain period of time, the heat exchanger (715) would have acquired sufficient heat and pressure from the water vapor pumped by the compressor (705). When this happens, the one or more heating element (110) will no longer be required to heat the feed solution from the feed tank (108) as the heat and pressure from the collected water vapor would be sufficient to heat and pressurize the feed solution in the heat exchanger (715). Hence, the one or more heating element (110) may be bypassed and the feed solution may be directed from the feed tank (108) directly to heat exchanger (715). System 700 becomes highly energy efficient at this stage as all the generated heat or pressure is reused efficiently.

It should be noted that a series of tubes or pipes may be used to connect the various components shown in water treatment systems (100), (600) and (700) together. It is also useful to note that systems (100), (600) and (700) are scalable whereby multiple multilayer modules (102) may be linked to improve water recovery. Heat generated by an initial multilayer module may be used to heat feed solution for a subsequent multilayer module.

Figure 8:
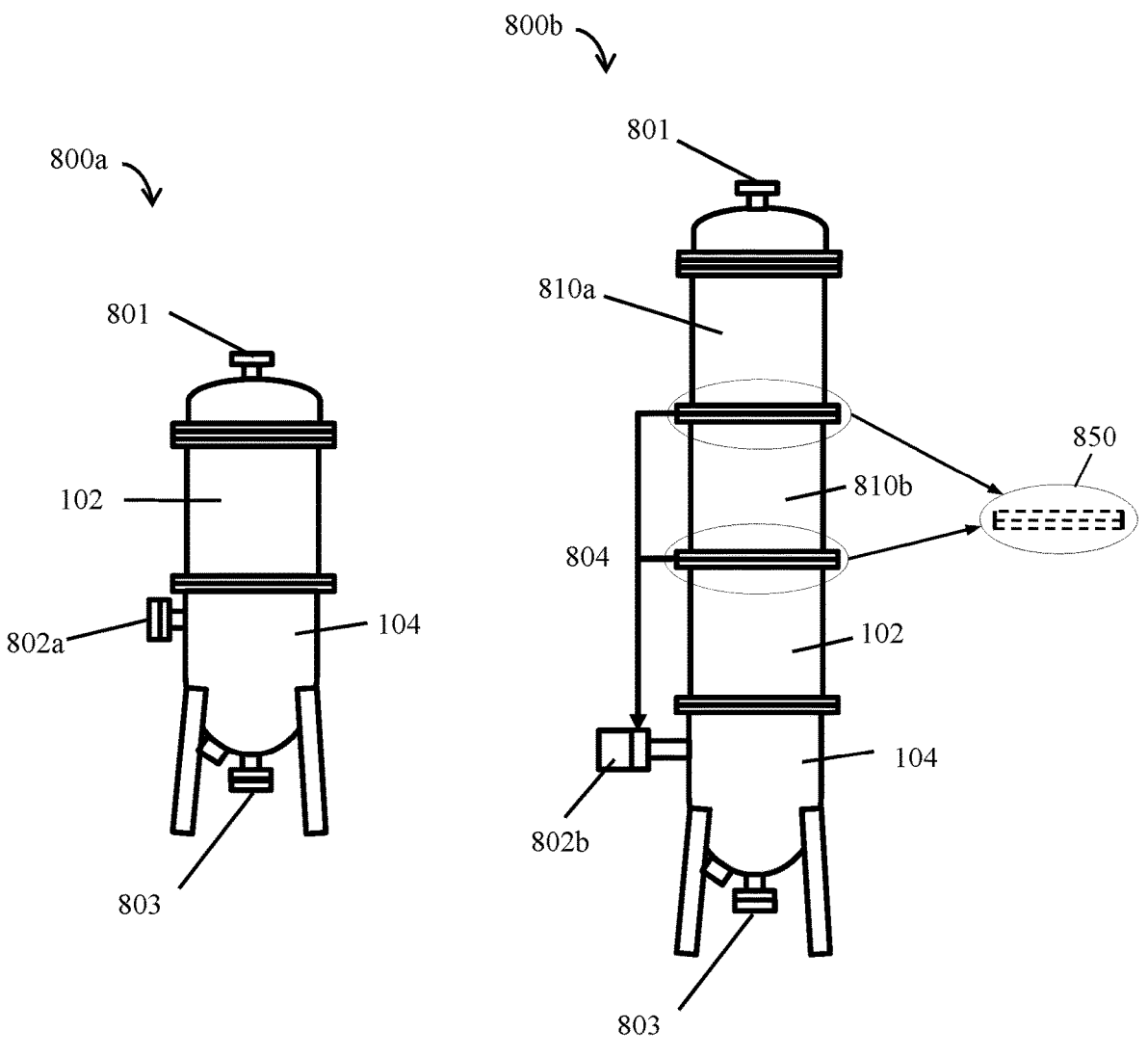
FIGS. 8a-8b are schematic drawings of a scalable distillation tower in accordance with embodiments of the invention.

FIG. 8 exemplifies the scalability of the present invention. FIG. 8a shows a distillation tower (800a) that forms part of the wastewater treatment system of this invention. The distillation tower (800a) comprises an inlet (801) for receiving the feed solution, the multilayer module (102), expansion chamber (104), vapor outlet (802a) through which vapor from the expansion chamber (104) exits and remnant outlet (803) through which remnant feed solution exits. FIG.

8b shows a scaled-up distillation tower (800b) that is similar to distillation tower (800a) but comprises three multilayer modules made up of modules (810a), (810b) and (102) that are stacked above the expansion chamber (104). One skilled in the art will recognize that any number of multilayer modules may be stacked up without deviating from the invention.

As illustrated in FIG. 8b, a liquid-vapor separator (850) may be used to allow at least two multilayer modules to be coupled and subsequently stacked together. In particular, the liquid-vapor separator (850) may be configured to couple the inlet of multilayer module (102) to an outlet of multilayer module (810b) such that feed solution from the outlet of multilayer module (810b) is separated from water vapor from the outlet of multilayer module (810b), and the separated feed solution from the outlet of multilayer module (810b) can be provided as the feed solution that flows into the feed spacer layer(s) of multilayer module (102). The water vapor from the outlet of multilayer module (810b) may be channeled out via path (804) to vapor outlet (802b).

Similarly, liquid-vapor separator (850) may be configured to couple the inlet of multilayer module 810b to an outlet of multilayer module (810a) such that feed solution from the outlet of multilayer module (810a) is separated from water vapor from the outlet of multilayer module (810a), and the separated feed solution from the outlet of multilayer module (810a) can be provided as the feed solution that flows into the feed spacer layer(s) of multilayer module (810b). The water vapor from the outlet of multilayer module (810a) may be channeled out via path (804) to vapor outlet (802b).

In embodiments of the invention, liquid-vapor separator (850) may comprise a plurality of fluid connectors which couple to feed spacer layers from two different multilayer modules such that fluids are able to flow seamlessly between the feed spacer layers of the two multilayer modules. Liquid-vapor separator (850) may also comprise a plurality of chambers that couple to the permeate spacer layers of a multilayer module such that the water vapor from these permeate spacer layers will be kept separate from the fluid flowing through the fluid connectors of liquid-vapor separator (850). The plurality of chambers are then fluidly connected to path (804) which in turn causes the water vapor to be channeled to vapor outlet (802b).

In a preferred embodiment, the liquid-vapor separator (850) may comprise a porous panel to allow fluid flow into an adjacent multilayer module.

When all three multilayer modules (810a), (810b) and (102) are stacked together to treat feed solution received at inlet (801), the amount of water vapor recovered may be increased as compared to when only one multilayer module is used.

In another aspect of the invention, feed tank (108) may be configured to receive and store a feed solution that is to be processed by the water treatment system. In this embodiment, the feed solution may comprise a heat-transfer liquid such as liquid desiccant, coolant or any type of liquid that is able to transfer heat easily. As mentioned in the previous embodiments, when the feed solution passes through heat exchangers, the feed solution will absorb heat from the heat exchanger. The heated feed solution is then pressurized and passed through multilayer module (102) and the expansion chamber (104). As heat is lost during this process, the resulting feed solution collected from the expansion chamber (104) is now at a much lower temperature than a temperature of the feed solution entering the multilayer module (102). When systems (100), (600) or (700) are utilized as such, the systems may then be used as a cooler system for removing heat from a heat exchanger.

Figure 9:
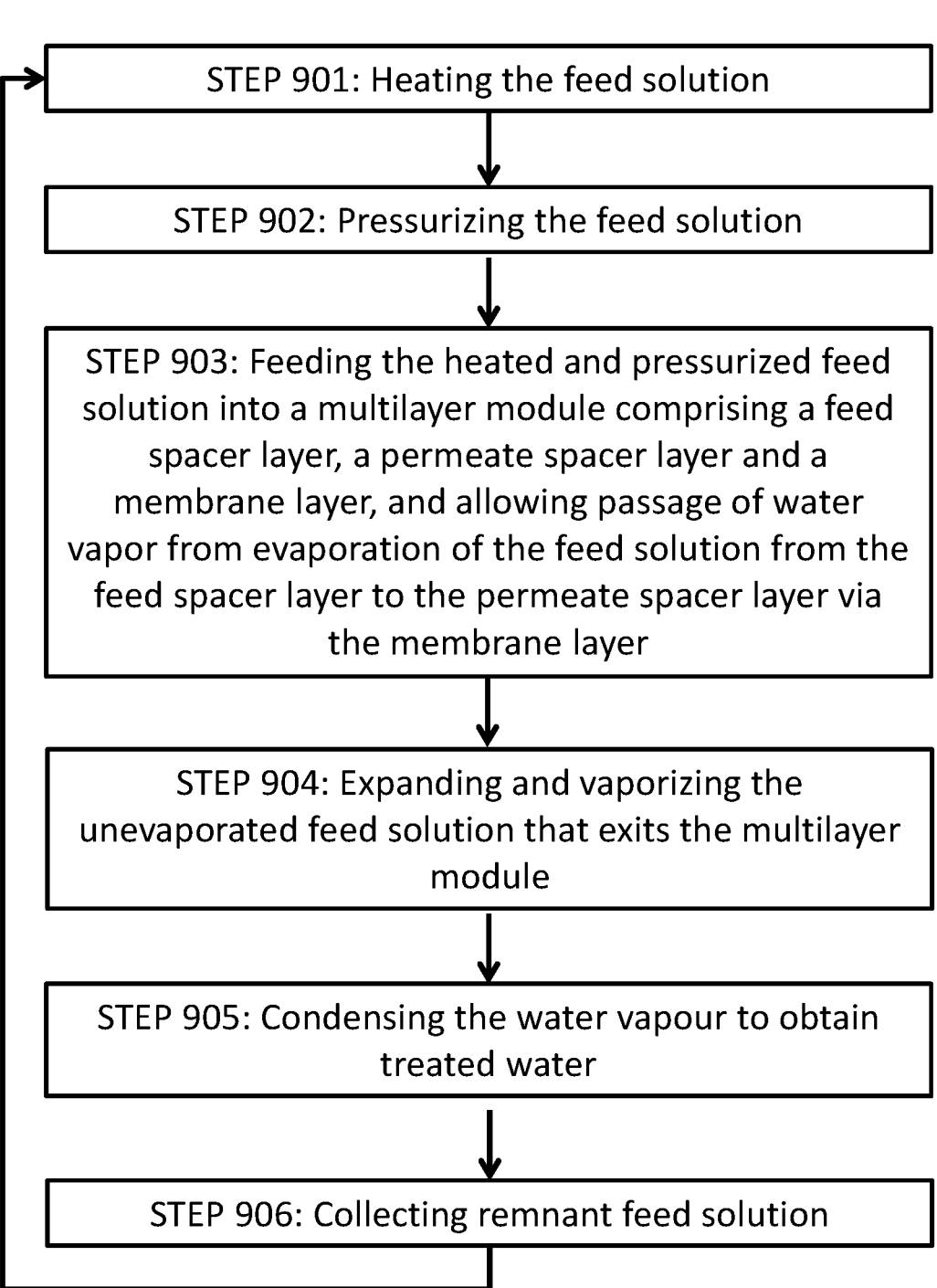
FIG. 9 illustrates a flowchart of an embodiment of a wastewater treatment process in accordance with embodiments of the invention.

In yet another aspect of the present invention, a process of treating a feed solution is provided. FIG. 9 shows a flowchart of process 900 that sets out the steps in accordance with an embodiment of the present invention. In Step 901, feed solution is heated and subsequently pressurized in Step 902. The person skilled in the art would readily understand that Step 901 and Step 902 may occur interchangeably or simultaneously without departing from this invention. The step of pressurizing the feed solution reduces energy demands for heating the feed solution to a desired temperature.

In Step 903, the heated and pressurized feed solution is fed into a multilayer module comprising a feed spacer layer (122), a permeate spacer layer (126) and a membrane layer (124). The membrane layer (124) is provided between the feed spacer layer (122) and the permeate spacer layer (126) and is permeable to water vapor but not water. The heated and pressurized feed solution evaporates as the feed solution moves along the feed spacer layer, with the resulting water vapor moving across or diffusing across the membrane layer to the permeate spacer layer due to differences in vapor pressure.

In Step 904, heated, pressurized feed solution that has not evaporated exits the multilayer module and enters an expansion chamber where the feed solution is subjected to a sudden decrease in pressure. This sudden decrease in pressure causes the exiting feed solution to expand and vaporize. In embodiments of the invention, water vapor is generated when the exiting feed solution rapidly expands.

In some embodiments, a partial to maximum vacuum or negative pressure may be applied to create a pressure difference between the expansion chamber and feed spacer layer. For instance, a vacuum generator may be used to maintain a partial to maximum vacuum or negative pressure in the expansion chamber.

In Step 905, the water vapor that exits the permeate spacer layer and/or the water vapor from expanding the feed solution is collected and condensed to obtain treated water.

In some embodiments, heat from the condensation of water vapor in Step 905 may be harnessed to heat the feed solution.

In a preferred embodiment, remnant feed solution that is not evaporated, is collected at Step 906 and returned to Step 901 for subsequent treatment.

The above is an exemplifying description of a water treatment system for treating a feed solution that may include but not limited to industrial wastewater, seawater, or wastewater from an upstream water treatment process such as reverse osmosis or the like. It is foreseen that those skilled in the art can and will design alternative embodiments of this invention as set forth in the following claims.

The invention claimed is:

1. A multilayer module for treating a feed solution, the multilayer module comprising:
   a first feed spacer layer having a first end provided adjacent an inlet of the multilayer module and a second end provided adjacent an outlet of the multilayer module to allow the feed solution to pass from the inlet to the outlet of the multilayer module;
   a first membrane layer having a first surface that is in contact with a surface of the first feed spacer layer; and
   a permeate spacer layer having a first surface that is in contact with a second surface of the first membrane layer such that water vapor evaporated from the feed solution in the first feed spacer layer passes through the first membrane layer into the permeate spacer layer, wherein the outlet of the multilayer module is configured to couple to an expansion chamber such that the expansion chamber receives the water vapor from the permeate spacer layer and the feed solution from the first feed spacer layer, whereby a pressure difference is provided between the expansion chamber and the feed spacer layer to cause the feed solution from the feed spacer layer to expand and vaporize into water vapor when the feed solution exits the outlet of the multilayer module.

2. The multilayer module of claim 1, further comprising:
   a second membrane layer having a first surface that is in contact with a second surface of the permeate spacer layer; and
   a second feed spacer layer having a first end provided adjacent to the inlet of the multilayer module and a second end provided adjacent to the outlet of the multilayer module to allow the feed solution to pass from the inlet to the outlet of the multilayer module, the second feed spacer layer having a first surface that is in contact with the second surface of the second membrane layer such that water vapor evaporated from the feed solution in the second feed spacer layer passes through the second membrane layer into the permeate spacer layer.

3. The multilayer module of claim 1, wherein the expansion chamber is maintained at a negative pressure.

4. The multilayer module of claim 1, wherein the multilayer module and the expansion chamber are configured to enable fluid flow from the multilayer module to the expansion chamber via gravity.

5. The multilayer module of claim 2, wherein the feed spacer layers, membrane layers and permeate spacer layer are arranged concentrically within the multilayer module.

6. The multilayer module of claim 2, wherein the feed spacer layers, membrane layers and permeate spacer layer are planar sheets that are stacked within the multilayer module.

7. The multilayer module of claim 2, wherein the feed spacer layers, membrane layers and permeate spacer layer form a composite layer that is folded one or more times within the multilayer module.

8. The multilayer module of claim 2, wherein the feed spacer layers, membrane layers and permeate spacer layer are arranged spirally within the multilayer module.

9. The multilayer module of claim 1, wherein an end of the permeate spacer layer proximal to the inlet of the multilayer module is not in direct contact with the feed solution at the inlet of the multilayer module.

10. The multilayer module of claim 2, wherein the membrane layers comprise a microporous structure, having an average pore size between 1 nm and 100 μm.

11. The multilayer module of claim 2, wherein the feed spacer layers or permeate spacer layer is made of a thermoplastic material selected from PTFE, PVDF, PP, PET, HDPE, LDPE, ABS, CPVC, PVC and UPVC.

12. The multilayer module of claim 2, wherein the feed spacer layers or the permeate spacer layer has a thickness of 0.001 mm to 100 mm.

13. The multilayer module of claim 2, wherein a spacer angle of the feed spacer layers or permeate spacer layer is 45° to 120°.

14. The multilayer module of claim 1, further comprising:
   a liquid-vapor separator provided at the inlet of the multilayer module, wherein the liquid-vapor separator is configured to couple the inlet of the multilayer module to an outlet of another multilayer module such that feed solution from the outlet of the another multilayer module is separated from water vapor from the outlet of the another multilayer module, and provided as feed solution to the first feed spacer layer of the multilayer module.

15. The multilayer module of claim 14, wherein the another multilayer module comprises:

a third feed spacer layer having a first end provided adjacent an inlet of the another multilayer module and a second end provided adjacent an outlet of the another multilayer module to allow the feed solution to pass from the inlet to the outlet of the another multilayer module;

a third membrane layer having a first surface that is in contact with a surface of the third feed spacer layer; and a second permeate spacer layer having a first surface that is in contact with a second surface of the third membrane layer such that water vapor evaporated from the feed solution in the third feed spacer layer passes through the third membrane layer into the second permeate spacer layer and diffuses out of the permeate space layer through the outlet of the another multilayer module, wherein the outlet of the another multilayer module is configured to couple to a porous panel.

* * * * *